(12) United States Patent
Iida et al.

(10) Patent No.: US 11,491,598 B2
(45) Date of Patent: *Nov. 8, 2022

(54) DUST COLLECTING SYSTEM

(71) Applicant: MAKITA CORPORATION, Anjo (JP)

(72) Inventors: Hitoshi Iida, Anjo (JP); Yoshiro Tada, Anjo (JP); Hideki Tsuji, Anjo (JP); Taro Hisano, Anjo (JP)

(73) Assignee: MAKITA CORPORATION, Anjo (JP)

( * ) Notice: Subject to any disclaimer, the term of this patent is extended or adjusted under 35 U.S.C. 154(b) by 258 days.

This patent is subject to a terminal disclaimer.

(21) Appl. No.: 16/830,455

(22) Filed: Mar. 26, 2020

(65) Prior Publication Data

US 2020/0306907 A1  Oct. 1, 2020

(30) Foreign Application Priority Data

Mar. 26, 2019 (JP) .............................. JP2019-059377
Jun. 26, 2019 (JP) .............................. JP2019-118901

(51) Int. Cl.
*B23Q 11/00* (2006.01)
*A47L 7/00* (2006.01)
(Continued)

(52) U.S. Cl.
CPC ........ *B23Q 11/0071* (2013.01); *A47L 7/0095* (2013.01); *B01D 46/4245* (2013.01);
(Continued)

(58) Field of Classification Search
CPC . B23Q 11/00; B23Q 11/0071; B23Q 11/0046; B23Q 11/0057; B01D 46/4245;
(Continued)

(56) References Cited

U.S. PATENT DOCUMENTS

2010/0197211 A1* 8/2010 Guth ...................... B28D 1/041
451/344
2013/0031881 A1* 2/2013 Machida ............ B23Q 11/0046
55/472
(Continued)

FOREIGN PATENT DOCUMENTS

DE 102012003073 A1 * 8/2013 ................ B25F 5/00
DE 102017131459 A1 * 12/2018 ............. A47L 5/362
(Continued)

OTHER PUBLICATIONS

DE102017131459A1_ENG (Espacenet machine translaiton of Caspar) (Year: 2018).*

(Continued)

*Primary Examiner* — Gabriel E Gitman
(74) *Attorney, Agent, or Firm* — Oliff PLC

(57) ABSTRACT

A dust collecting system includes a power tool and a stationary dust collector. The power tool is configured to perform processing operation on a workpiece by driving a tool accessory. The stationary dust collector is configured to be placed separately from the power tool and to collect dust generated by the processing operation. The power tool includes a first motor and a driving mechanism configured to drive the tool accessory by power of the first motor. The dust collector includes a second motor and a fan configured to be rotationally driven by the second motor to generate air flow for collecting dust. The dust collecting system includes a control device configured to control a rotation speed of the second motor according to a driving state of the power tool.

16 Claims, 11 Drawing Sheets

(51) Int. Cl.
  *B01D 46/44* (2006.01)
  *B23B 45/02* (2006.01)
  *B01D 46/42* (2006.01)

(52) U.S. Cl.
  CPC .............. *B01D 46/44* (2013.01); *B23B 45/02* (2013.01); *B01D 2273/28* (2013.01)

(58) Field of Classification Search
  CPC ....... B01D 46/44; B23B 45/02; A47L 7/0095; B25D 2216/0015; B25D 2216/0023; B25D 2216/0038; B25D 17/00; B25D 17/20; B25D 16/00; B25F 5/00; B23D 59/006; B24B 55/06
  See application file for complete search history.

(56) References Cited

U.S. PATENT DOCUMENTS

| | | | |
|---|---|---|---|
| 2015/0040341 A1* | 2/2015 | Wiedemann | B23Q 11/0046 15/344 |
| 2016/0100724 A1* | 4/2016 | Valentini | A47L 9/2836 15/319 |
| 2016/0151846 A1 | 6/2016 | Suzuki | |
| 2018/0099391 A1 | 4/2018 | Umemoto et al. | |
| 2019/0030669 A1* | 1/2019 | Wu | B23Q 11/0071 |
| 2019/0358758 A1 | 11/2019 | Ullrich et al. | |

FOREIGN PATENT DOCUMENTS

| | | |
|---|---|---|
| JP | S62-236673 A | 10/1987 |
| JP | H03-128625 A | 5/1991 |
| JP | 2004-195565 A | 7/2004 |
| JP | 2013-230510 A | 11/2013 |
| JP | WO2016152921 A1 * | 9/2016 ............. B23Q 11/00 |
| JP | 2018-058188 A | 4/2018 |
| JP | 2019-209390 A | 12/2019 |
| WO | 2018/180896 A1 | 10/2018 |

OTHER PUBLICATIONS

WO2016152921A1_ENG (Espacenet machine translation of Kasuya) (Year: 2016).*
DE102012003073A1_ENG (Espacenet machine translation of Barabeisch) (Year: 2013).*
Aug. 8, 2022 Office Action issued in Japanese Patent Application No. JP2019-059377.
Sep. 12, 2022 Office Action issued in U.S. Appl. No. 16/831,343.

* cited by examiner

DUST COLLECTING SYSTEM

CROSS-REFERENCE TO RELATED APPLICATION

The present application claims priority to Japanese patent application No. 2019-59377 filed on Mar. 26, 2019 and Japanese patent application No. 2019-118901 filed on Jun. 26, 2019. The contents of the foregoing applications are fully incorporated herein by reference.

TECHNICAL FIELD

The present disclosure relates to a dust collecting system that includes a power tool and a dust collector.

BACKGROUND ART

A dust collecting system is known which includes a power tool configured to perform processing operation on a workpiece by driving a tool accessory and a dust collector configured to be placed on floor or ground separately from the power tool and to collect dust generated by the processing operation. For example, in a dust collecting system disclosed in PCT International Publication No. WO 2018-180896, a motor for driving a tool accessory (also referred to as a driving motor) is provided in a power tool, while a motor for driving a dust collection fan (also referred to as a dust-collection motor) is provided in a dust collector, and the dust-collection motor is driven in conjunction with the driving motor.

SUMMARY

The present disclosure provides a dust collecting system which includes a power tool and a stationary dust collector. The power tool is configured to perform processing operation on a workpiece by driving a tool accessory. The stationary dust collector is configured to be placed separately from the power tool and to collect dust generated by the processing operation.

The power tool includes a first motor and a driving mechanism. The driving mechanism is configured to drive the tool accessory by power of the first motor. The dust collector includes a second motor and a fan. The fan is configured to be rotationally driven by the second motor to generate air flow for collecting dust. Further, the dust collecting system includes a control device configured to control a rotation speed of the second motor according to a driving state of the power tool.

The control device may be provided in the power tool or in the dust collector. The control device may include one control circuit or a plurality of control circuits. In the latter case, at least one of the control circuits may be provided in the power tool and at least another one of the control circuits may be provided in the dust collector.

The 'stationary dust collector_ in the present aspect may refer to a dust collector of a type which is intended to be placed on a surface such as floor, ground and a top plate for use. The 'stationary dust collector_ need not necessarily be fixed on the surface.

The driving state of the power tool may refer to, for example, a driving state (such as whether being driven or not, load, rotation speed, etc.) of the first motor or the driving mechanism, or a motion state (such as a vibration state and a rotation state) of the power tool.

DETAILED DESCRIPTION OF THE EMBODIMENTS

Embodiments of the present disclosure are described below with reference to the drawings.

First Embodiment

Figure 1:
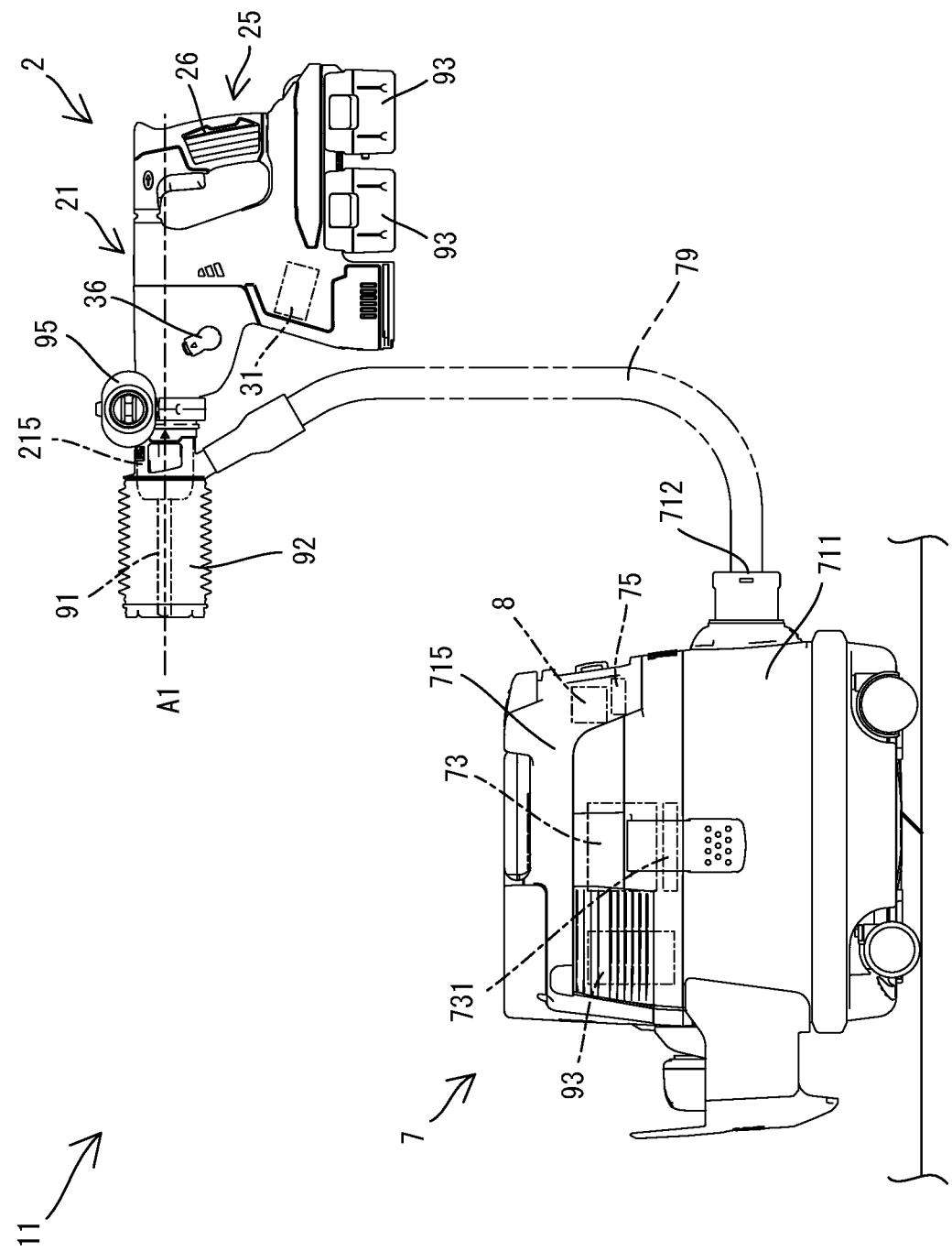
FIG. 1 is an explanatory drawing for showing the overall structure of a dust collecting system.

A dust collecting system 11 according to a first embodiment is now described with reference to FIGS. 1 to 9. As shown in FIG. 1, the dust collecting system 11 of the present embodiment includes a hammer drill 2 and a dust collector 7. Both the hammer drill 2 and the dust collector 7 are configured to operate with electric power which is supplied from a rechargeable battery (also referred to as a battery pack) 93.

The hammer drill 2 is configured to perform processing operation (such as chipping operation and drilling operation) by driving a removably coupled tool accessory 91 by power of a driving motor 31. More specifically, the hammer drill 2 is configured to perform hammering motion of linearly driving the tool accessory 91 along a driving axis A1 and drilling motion of rotationally driving the tool accessory 91 around the driving axis A1. The chipping operation is performed by the hammering motion, and the drilling operation is performed by the drilling motion. The hammer drill 2 is a hand-held power tool, and has an elongate grip part 26 to be held by a user. In an axial direction of the driving axis A1, the grip part 26 is provided on one side of the hammer drill 2 which is opposite to a side where the tool accessory 91 is coupled. The grip part 26 extends in a direction which is generally orthogonal to the driving axis A1.

The dust collector 7 is of a stationary type which is separately placed from the hammer drill 2 for use. Further, the term 'stationary type_ used herein refers to a type which is intended to be placed on a surface such as floor, ground and a top plate when the dust collector 7 is used, and is not necessarily required to be fixed on the surface. The dust collector 7 can be connected, via a hose 79, to a dust-collecting cup 92 attached to the hammer drill 2. The dust collector 7 is configured to suck and collect dust generated by processing operation through the dust-collecting cup 92 and the hose 79 using air flow generated by a fan 731 which is rotated along with driving of a dust-collection motor 73.

The detailed structure of the dust collecting system 11 is now described.

First, the physical structure of the hammer drill 2 is described. In the following description, for convenience sake, an axial direction of the driving axis A1 (also referred to as a driving-axis-A1 direction) is defined as a front-rear direction of the hammer drill 2. In the front-rear direction, the side to which the tool accessory 91 is coupled is defined as a front side (also referred to as a front-end-region side) of the hammer drill while the side on which the grip part 26 is provided is defined as a rear side. Further, a direction which is orthogonal to the driving axis A1 and which corresponds to a longitudinal direction of the grip part 26 is defined as an up-down direction of the hammer drill 2. In the up-down direction, the side of one end of the grip part 26 which is closer to the driving axis A1 is defined as an upper side, while the side of the other end which is further away from the driving axis A1 is defined as a lower side. Furthermore, a direction which is orthogonal to the front-rear direction and the up-down direction is defined as a left-right direction.

Figure 2:
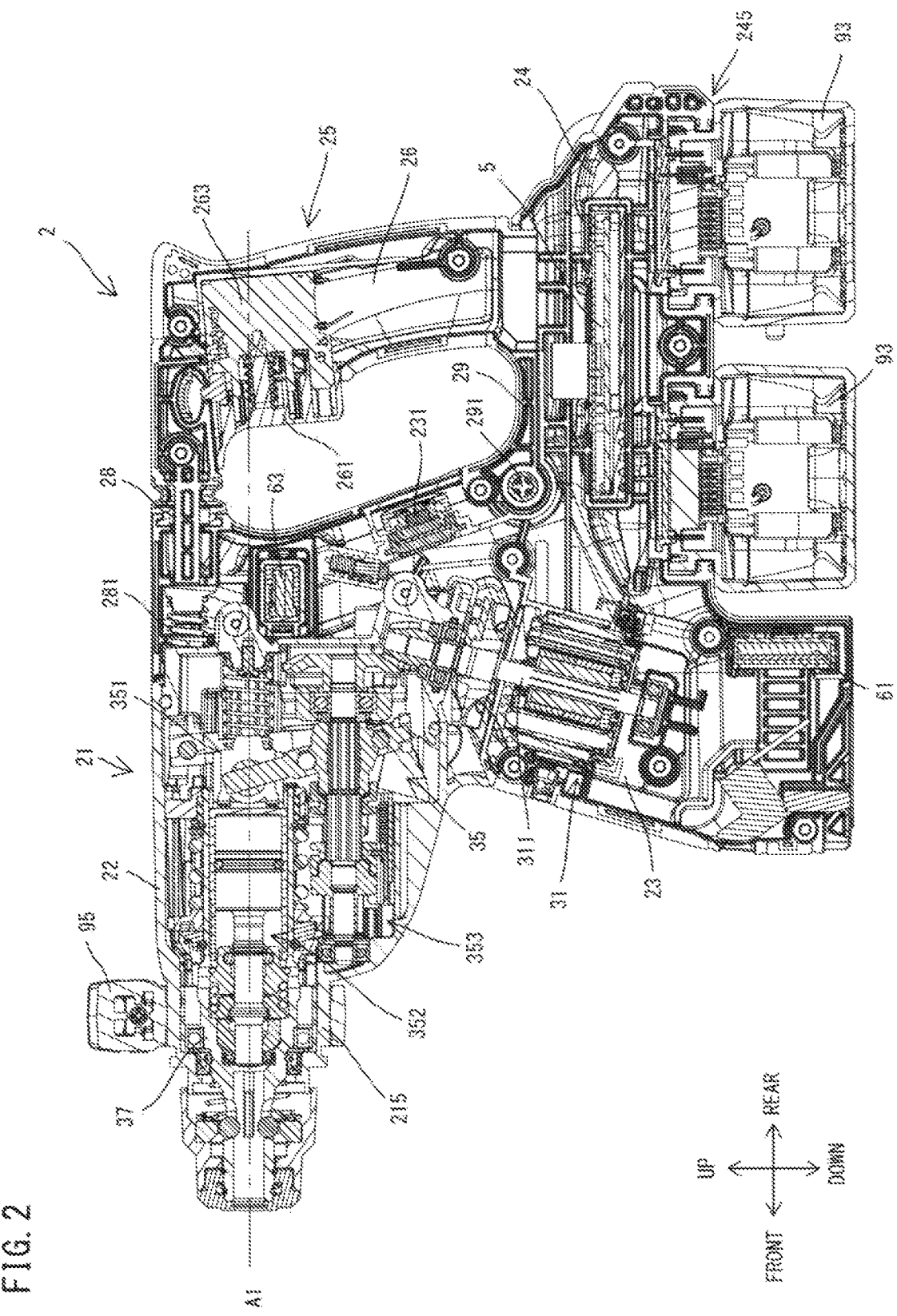
FIG. 2 is a sectional view of a hammer drill.

As shown in FIG. 2, an outer shell of the hammer drill 2 is mainly formed by a body housing 21 and a handle 25.

The body housing 21 includes a driving-mechanism-housing part 22, a motor-housing part 23 and a controller-housing part 24. The body housing 21 is generally Z-shaped in a side view as a whole.

The driving-mechanism-housing part 22 and its internal structure are now described. As shown in FIG. 2, the driving-mechanism-housing part 22 is formed as an elongate box-like body and extends along the driving axis A1. The driving-mechanism-housing part 22 houses a tool holder 37, the driving mechanism 35 and a wireless adapter 63.

The tool holder 37 is configured to removably receive the tool accessory 91, and disposed within a front end portion of the driving-mechanism-housing part 22. Further, the frond end portion of the driving-mechanism-housing part 22 in which the tool holder 37 is housed has a cylindrical shape, and is referred to as a barrel part 215. The dust-collecting cup 92 (see FIG. 1) and an auxiliary handle 95 can be removably attached onto an outer periphery of the barrel part 215.

The driving mechanism 35 is configured to drive the tool accessory 91 held by the tool holder 37, by power of the driving motor 31. In the present embodiment, the driving mechanism 35 includes a motion-converting mechanism 351, a striking mechanism 352 and a rotation-transmitting mechanism 353. The structure of the driving mechanism 35 is well known and therefore only briefly described here. The motion-converting mechanism 351 is configured to convert rotation of the motor shaft 311 into linear motion and transmit it to the striking mechanism 352. In the present embodiment, the motion-converting mechanism 351 is of a type using a swinging member. The striking mechanism 352 is configured to linearly operate to strike the tool accessory 91, thus linearly driving the tool accessory 91 along the driving axis A1. In the present embodiment, the striking mechanism 352 includes a striker and an impact bolt. The rotation-transmitting mechanism 353 is configured to decelerate rotation of the motor shaft 311 and then transmit it to the tool holder 37, thus rotationally driving the tool accessory 91. The rotation-transmitting mechanism 353 includes a plurality of gears.

The hammer drill 2 of the present embodiment has three operation modes of a hammer drill mode, a hammer mode and a drill mode. In the hammer drill mode, the hammering motion and the drilling motion are performed by driving the motion-converting mechanism 351 and the rotation-transmitting mechanism 353. In the hammer mode, only the hammering motion is performed by interrupting power transmission in the rotation-transmitting mechanism 353 and driving only the motion-converting mechanism 351. In the drill mode, only the drilling motion is performed by interrupting power transmission in the motion-converting mechanism 351 and driving only the rotation-transmitting mechanism 353.

A user can select one of the three operation modes by externally operating a mode-switching dial 36 (see FIG. 1). A mode-switching mechanism is provided within the body housing 21. The mode-switching mechanism is connected to the mode-switching dial 36, and configured to switch the motion-converting mechanism 351 and the rotation-transmitting mechanism 353 between a transmission state and a transmission-interrupted state according to the selected operation mode. The structure of such a mode-switching mechanism is well known and therefore it is not described in detail and not shown in the drawings here.

The wireless adapter 63 is be capable of wireless communication with an external device. The wireless adapter 63 is a separate device from the hammer drill 2 and is removably mounted to an adapter-mounting part provided within the driving-mechanism-housing part 22. Although not shown in detail, the adapter-mounting part includes a housing recess and a connector 57 (see FIG. 3). The housing recess has an insertion port formed in a right wall of the driving-mechanism-housing part 22. The wireless adapter 63 can be inserted into the housing recess through the insertion port. When the wireless adapter 63 is inserted to a specific position of the housing recess, a connector 631 (see FIG. 3) of the wireless adapter 63 is electrically connected to the connector 57 of the adapter-mounting part. Thus, the wireless adapter 63 is electrically connected to a controller 5 via the connectors 631 and 57.

The motor-housing part 23 and its internal structure are described. As shown in FIG. 2, the motor-housing part 23 is formed as an elongate box-like body which is connected to a rear end portion of the driving-mechanism-housing part 22 and extends downward. The motor-housing part 23 houses the driving motor 31, a speed-change-dial unit 231 and an acceleration sensor unit 61.

The driving motor 31 is housed in an upper portion of the motor-housing part 23. In the present embodiment, a direct current (DC) brushless motor is adopted as the driving motor 31. The driving motor 31 is disposed within the motor-housing part 23 such that a rotation axis of the motor shaft 311 extends obliquely downward and forward relative to the driving axis A1.

The speed-change-dial unit 231 is housed in a rear upper end portion of the motor-housing part 23. Although not shown in detail, the speed-change-dial unit 231 includes a dial which can be turned from the outside of the motor-housing part 23 by a user, and a variable resistor. The speed-change-dial unit 231 is connected to the controller 5 and configured to output to the controller 5 a signal which indicates a resistance value (i.e. set rotation speed) corresponding to the turning operation of the dial.

The acceleration sensor unit 61 is supported in a lower rear portion (i.e. in a region which is on the lower side of the driving motor 31) of the motor-housing part 23. Although not shown in detail, the acceleration sensor unit 61 includes a case, a board housed in the case and an acceleration sensor 611 (see FIG. 3) mounted on the board. The acceleration sensor 611 is configured to detect acceleration as an index value (physical quantity) which indicates vibration of the body housing 21. The acceleration sensor 611 is configured to output to the controller 5 a signal which indicates the detected acceleration. Further, in the present embodiment, as the acceleration sensor 611, a triaxial acceleration sensor is adopted which is capable of detecting acceleration in three directions, which is, the front-rear, left-right and up-down directions.

The controller-housing part 24 and its internal structure are described. As shown in FIG. 2, the controller-housing part 24 is a rectangular box-like portion of the body housing 21 which extends rearward from a generally central portion (where a body (a stator and a rotor) of the driving motor 31 is housed) of the motor-housing part 23 in the up-down direction. The controller 5 is housed in the controller-housing part 24. Although not shown in detail, the controller 5 includes a case, a board housed in the case and a control circuit 50 (see FIG. 3) mounted on the board. In the present embodiment, the controller 5 is configured to control driving of the driving motor 31 based on the rotation speed set with the speed-change-dial unit 231, an operation state of the trigger 261 and vibration of the body housing 21.

Further, in the present embodiment, two battery-mounting parts 245 are provided side by side in the front-rear direction on a lower end portion (on the lower side of the controller 5) of the controller-housing part 24, so that two batteries 93 can be mounted to the hammer drill 2. Each of the battery-mounting parts 245 has guide rails and terminals. The battery 93 can be slidingly engaged with the guide rails. The terminals can be electrically connected to corresponding terminals of the battery 93. These structures are well-known and therefore are not described in detail.

The handle 25 and its internal structure are described. As shown in FIG. 2, the handle 25 is generally C-shaped in a side view as a whole. Both ends of the handle 25 are connected to a rear end portion of the body housing 21. The handle 25 includes the grip part 26, an upper connection part 28 and a lower connection part 29.

The grip part 26 is arranged apart rearward from the body housing 21 and extends generally in the up-down direction, crossing the driving axis A1. The trigger 261, which can be depressed by a user, is provided in a front upper end portion of the grip part 26. The grip part 26 has an elongate cylindrical shape and houses a switch 263 inside. The switch 263 is normally kept in an OFF state and turned ON in response to operation of depressing the trigger 261. Thus, the switch 263 is configured to detect depressing and releasing of the trigger 261. Further, the switch 263 is configured to output a signal corresponding to the operation amount of the trigger 261 to the controller 5 when the switch 263 is in the ON state.

The upper connection part 28 extends forward from an upper end portion of the grip part 26 and is connected to an upper rear end portion of the body housing 21. The lower connection part 29 extends forward from a lower end portion of the grip part 26 and is connected to a central portion of the rear end portion of the body housing 21. Further, the lower connection part 29 is arranged on the upper side of the controller-housing part 24. In the present embodiment, the handle 25 is elastically connected to the body housing 21 so as to be movable relative to the body housing 21. More specifically, an elastic member 281 is disposed between a front end portion of the upper connection part 28 and a rear end portion of the driving-mechanism-housing part 22. The lower connection part 29 is pivotally supported to the motor-housing part 23 via a support shaft 291 extending in the left-right direction. By provision of such a structure, transmission of vibration from the body housing 21 to the handle 25 (the grip part 26) can be suppressed.

Next, the physical structure of the dust collector 7 is described. The dust collector 7 is used in a state in which the dust collector 7 is placed on a floor or the like, as described above. Therefore, in the following description, for convenience sake, as shown in FIG. 1, the up-down direction of the dust collector 7 is defined on the basis of the orientation of the dust collector 7 placed on substantially horizontal floor. An outer shell of the dust collector 7 is mainly formed by a tank 711 and a cover 715.

The tank 711 has a rectangular box-like shape having an open upper end. The tank 711 occupies a lower portion of the dust collector 7. The tank 711 is a container part for storing sucked dust, and a filter (not shown) for separating and capturing dust from air flow is disposed inside the tank 711. Further, casters for movement are attached to a lower end portion of the tank 711. A hose-insertion port 712 is provided on one side of the tank 711. The hose-insertion port 712 is an opening for communication between the inside and the outside of the tank 711. A hose 79 for connection with the dust-collecting cup 92 and other plural kinds of hoses can be selectively attached to the hose-insertion port 712. The dust collector 7 can be used with not only the hammer drill 2 but also with various other power tools (such as an electric hammer, a circular saw, a grinder and a cutter). Further, the dust collector 7 can also be used as a normal vacuum cleaner when a hose having a nozzle attached thereto is mounted to the dust collector 7.

The cover 715 has a rectangular box-like shape having an open lower end and is disposed on the upper end of the tank 711 so as to cover the opening of the tank 711.

The dust-collection motor 73, the fan 731, a controller 8 and a wireless adapter 75 are housed within an upper portion of the dust collector 7 (more specifically, in the inside of the cover 715).

In the present embodiment, a DC motor with a brush is adopted as the dust-collection motor 73. The dust-collection motor 73 is arranged such that a rotation axis of a motor shaft (not shown) extends in the up-down direction. The fan 731 is fixed to a lower end portion of the motor shaft. The fan 731 is configured to rotate together with the motor shaft to generate airflow for collecting dust when the dust-collection motor 73 is driven. Specifically, suction force is generated in the hose-insertion port 712 by rotation of the fan 731, and outside air is sucked in together with dust through the hose 79 and led into the tank 711. The dust is separated from the air by the filter (not shown) within the tank 711, and thereafter the air is led into the cover 715 and discharged from a discharge outlet to the outside via the fan 731.

The controller 8 is configured to control operation of the dust collector 7. The wireless adapter 75 is capable of wireless communication with an external device. The wireless adapter 75 has substantially the same structure as the wireless adapter 63 mounted to the hammer drill 2, and is mounted to an adapter-mounting part (not shown) provided in the inside of the dust collector 7. The wireless adapter 75 mounted to the adapter-mounting part is electrically connected to the controller 8 via the connector 751 and a connector 87 (see FIG. 3) of the adapter-mounting part.

Further, a battery-mounting part (not shown) having substantially the same structure as the battery-mounting part 245 of the hammer drill 2 is provided in the upper portion (more specifically, in the inside of the cover 715) of the dust collector 7. The battery 93 which can also be used for the hammer drill 2 and other power tools is removably mounted to this battery-mounting part. In the present embodiment, two such battery-mounting parts are provided and two batteries 93 can be mounted to the dust collector 7.

The electrical configuration of the dust collecting system 11 (the hammer drill 2 and the dust collector 7) is now described with reference to FIG. 3.

Figure 3:
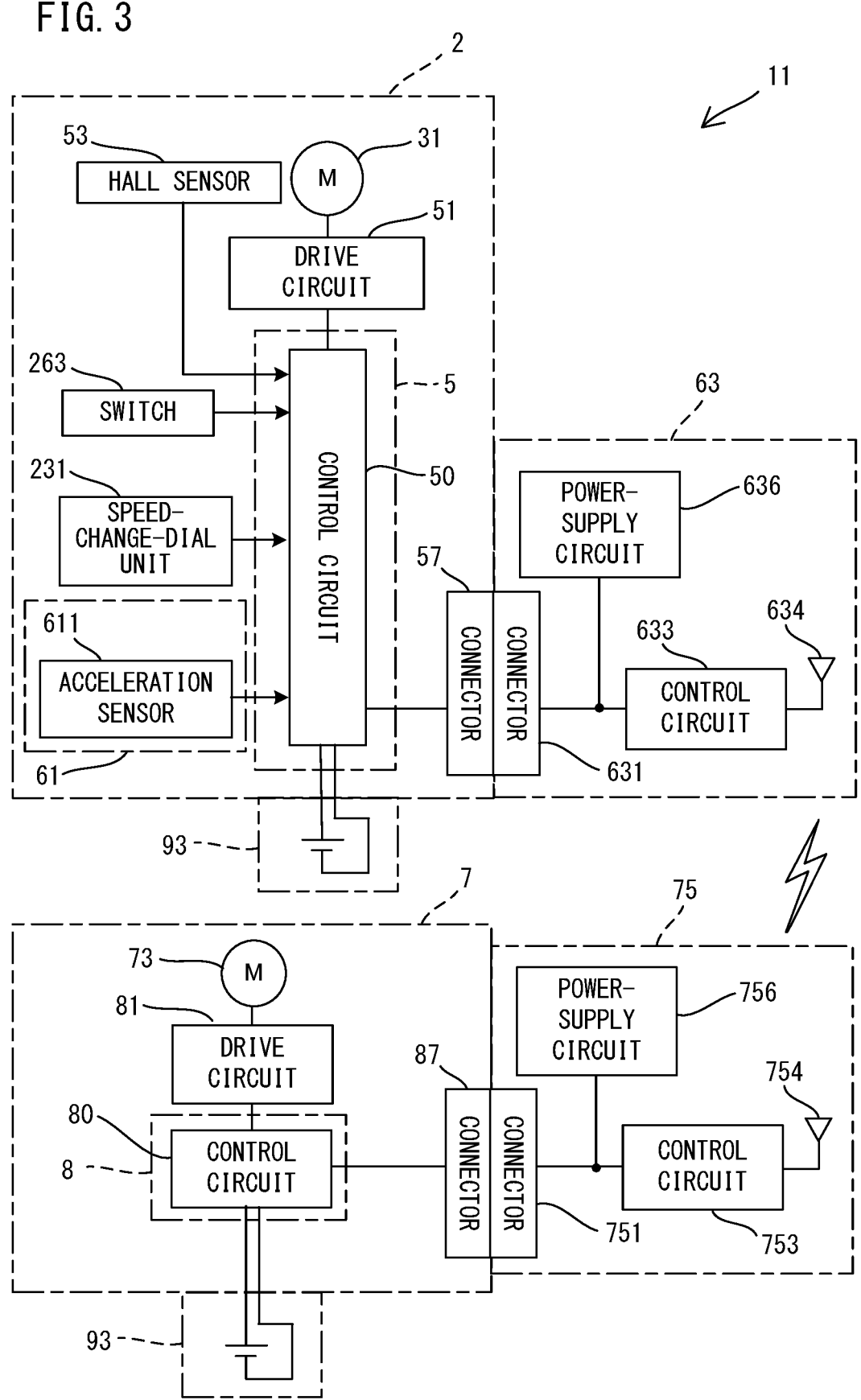
FIG. 3 is a block diagram showing the electrical configuration of the dust collecting system.

As shown in FIG. 3, the hammer drill 2 has the control circuit 50 mounted on the board of the controller 5. A drive circuit 51, a hall sensor 53, the switch 263, the speed-change-dial unit 231, the acceleration sensor 611 and the connector 57 of the adapter-mounting part are electrically connected to the control circuit 50.

In the present embodiment, the control circuit 50 is formed by a microcomputer including a CPU and a memory (such as a ROM and a RAM). The drive circuit 51 includes a three-phase bridge circuit using six semiconductor switching elements. The hall sensor 53 has three hall elements which are arranged corresponding to respective phases of the driving motor 31, and outputs a signal indicating a rotation position of the rotor to the control circuit 50. As described above, the switch 263 outputs to the control circuit 50 a signal corresponding to the operation amount of the trigger 261 in response to operation of the trigger 261. The speed-change-dial unit 231 outputs to the control circuit 50 a signal corresponding to the rotation speed set via turning operation of the dial. The acceleration sensor 611 outputs a signal corresponding to the detected acceleration to the control circuit 50.

The control circuit 50 starts or stops driving of the driving motor 31 based on various kinds of signals inputted from the hall sensor 53, the switch 263, the speed-change-dial unit 231 and the acceleration sensor 611. Further, the control circuit 50 appropriately sets the rotation speed of the driving motor 31 and then sets a drive duty ratio of each of the switching elements according to the rotation speed and outputs a control signal corresponding to the set drive duty ratio to the drive circuit 51. In this manner, the control circuit 50 controls driving of the driving motor 31.

As described above, when the wireless adapter 63 is mounted to the adapter-mounting part, the control circuit 50 is electrically connected to the wireless adapter 63 via the connector 57. The wireless adapter 63 includes a connector 631, a power-supply circuit 636, a control circuit 633 and an antenna 634.

The connector 631 is configured to be electrically connected to the connector 57. Power for operation of the wireless adapter 63 is inputted from the controller 5 to the power-supply circuit 636 via the connectors 57 and 631. At this time, based on this power for operation, the power-supply circuit 636 generates internal power for operating parts of the wireless adapter 63 including the control circuit 633 and supplies it to each of the parts. Each of the parts in the wireless adapter 63 is operated by this internal power.

The control circuit 633 includes a processor, a memory, a transmission circuit and a reception circuit. The control circuit 633 is configured to perform wireless communication with external devices via the antenna 634, by using radio waves of a specified frequency band. The control circuit 633 can be connected to the control circuit 50 of the controller 5 via the connectors 631 and 57. In the present embodiment, the control circuit 633 is configured to transmit information relating to the driving state of the hammer drill 2 to the wireless adapter 75 of the dust collector 7 according to a control signal from the control circuit 50.

As shown in FIG. 3, the dust collector 7 has a control circuit 80 mounted on the board (circuit board) of the controller 8. A drive circuit 81 and the connector 87 of the adapter-mounting part are electrically connected to the control circuit 80.

In the present embodiment, like the control circuit 50, the control circuit 80 is formed by a microcomputer including a CPU and a memory (such as a ROM and a RAM). The drive circuit 81 is configured to drive the dust-collection motor 73 according to a control signal from the control circuit 80.

As described above, the wireless adapter 75 has substantially the same structure as the wireless adapter 63 of the hammer drill 2, and includes the connector 751, a power-supply circuit 756, a control circuit 753 and an antenna 754. The connector 751 is electrically connectable to the connector 87. Based on power for operation which is inputted from the controller 8 to the power-supply circuit 756 via the connectors 87 and 751, the power-supply circuit 756 generates internal power for operating parts of the wireless adapter 75 and supplies it to each of the parts. The control circuit 753 includes a processor, a memory, a transmission circuit and a reception circuit. The control circuit 753 is configured to perform wireless communication with external devices via the antenna 754, by using radio waves of a specified frequency band. The control circuit 753 can be connected to the control circuit 80 of the controller 8 via the connectors 751 and 87. In the present embodiment, the control circuit 633 is configured to receive information relating to the driving state of the hammer drill 2 from the wireless adapter 63 of the hammer drill 2 and to output it to the control circuit 80.

Operation control in the dust collecting system 11 is now described. In the present embodiment, driving of the driving motor 31 of the hammer drill 2 is controlled by the control circuit 50 of the hammer drill 2, while driving of the dust-collection motor 73 of the dust collector 7 is separately controlled by the control circuit 80 of the dust collector 7.

First, control of the driving motor 31 by the control circuit 50 (more specifically, CPU) of the hammer drill 2 is described.

In the present embodiment, the control circuit 50 is configured to perform so-called soft-no-load control for the driving motor 31. The soft-no-load control refers to a driving control method in which when the switch 263 is in the ON state, the rotation speed of the driving motor 31 is limited to a preset relatively low rotation speed (hereinafter referred to as an initial rotation speed) or less in an unloaded state, in which load is not applied to the tool accessory 91, while the rotation speed of the driving motor 31 is allowed to exceed the initial rotation speed in a loaded state. The soft-no-load control can reduce wasteful power consumption of the driving motor 31 in the unloaded state. In the present embodiment, the loaded state and the unloaded state are discriminated from each other, based on whether or not the vibration (acceleration) detected by the acceleration sensor 611 exceeds a specified threshold. The control circuit 50 controls the rotation speed of the driving motor 31 based on whether the acceleration signal outputted from the acceleration sensor 611 is a signal indicating the unloaded state or a signal indicating the loaded state.

In the present embodiment, the rotation speed set with the speed-change-dial unit 231 is used as a rotation speed (i.e. maximum rotation speed) to be set corresponding to the maximum operation amount of the trigger 261. The rotation speed of the driving motor 31 is set based on the maximum rotation speed and the actual operation amount (percentage) of the trigger 261.

Specifically, when the switch 263 is turned on, the control circuit 50 monitors acceleration signals from the acceleration sensor 611. In the unloaded state of the hammer drill 2, in a case where the rotation speed which is calculated based on the maximum rotation speed and the operation amount of the trigger 261 is not more than the initial rotation speed, the control circuit 50 drives the driving motor 31 at the calculated rotation speed. On the other hand, in a case where the calculated rotation speed exceeds the initial rotation speed in the unloaded state, the control circuit 50 drives the driving motor 31 at the initial rotation speed. Further, after the hammer drill 2 shifts from the unloaded state to the loaded state, the control circuit 50 drives the driving motor 31 at the rotation speed which is calculated based on the maximum rotation speed and the operation amount of the trigger 261. When the depressing operation of the trigger 261 is released and the switch 263 is turned off, the control circuit 50 stops driving of the driving motor 31.

Next, control of the dust-collection motor 73 by the control circuit 80 (more specifically, CPU) of the dust collector 7 is described.

In the present embodiment, the control circuit 80 is configured to control the rotation speed of the dust-collection motor 73 according to the driving state of the hammer drill 2. The driving state of the hammer drill 2 may refer to, for example, a driving state (such as whether being driven or not, the load and the rotation speed) of the driving motor 31 or the driving mechanism 35, a motion state (such as a vibration state and a rotation state) of the hammer drill 2 (specifically, the body housing 21). If the driving state of the hammer drill 2 changes, the generation state of dust may also change. Therefore, the control circuit 80 is configured to control the rotation speed of the dust-collection motor 73 according to the driving state of the hammer drill 2, so that the dust collecting power of the dust collector 7 can be changed to appropriately cope with a situation where dust is easily generated and a situation where dust is not easily generated.

Examples of the driving state of the hammer drill 2 which may be adopted in the present embodiment and control of the rotation speed of the dust-collection motor 73 according to the driving state are now described.

A first example is now described in which the rotation speed of the driving motor 31 is used as the driving state of the hammer drill 2. In this example, the control circuit 80 is configured to change the rotation speed of the dust-collection motor 73 according to the rotation speed of the driving motor 31. The rotation speed of the dust-collection motor 73 can be changed by adjusting supply of electric power (current) to the dust-collection motor 73 via the drive circuit 81.

Specifically, while the switch 263 is in the ON state, the control circuit 50 of the hammer drill 2 causes the control circuit 633 of the wireless adapter 63 to transmit a signal indicating the rotation speed of the driving motor 31 via the antenna 634. The control circuit 753 of the wireless adapter 75 of the dust collector 7 appropriately processes the signal received via the antenna 754, and outputs it to the control circuit 80 of the dust collector 7. The signal transmitted from the wireless adapter 63 may be a signal indicating the rotation speed set by the control circuit 50, or a signal indicating the actual rotation speed of the driving motor 31 which is determined by an output signal from the hall sensor 53. The control circuit 80 sets the rotation speed of the dust-collection motor 73 based on a predetermined correspondence between the rotation speed of the driving motor 31 and the rotation speed of the dust-collection motor 73. Information defining the correspondence (hereinafter referred to as correspondence information) may be stored in advance, for example, in the memory of the control circuit 80.

Figure 4:
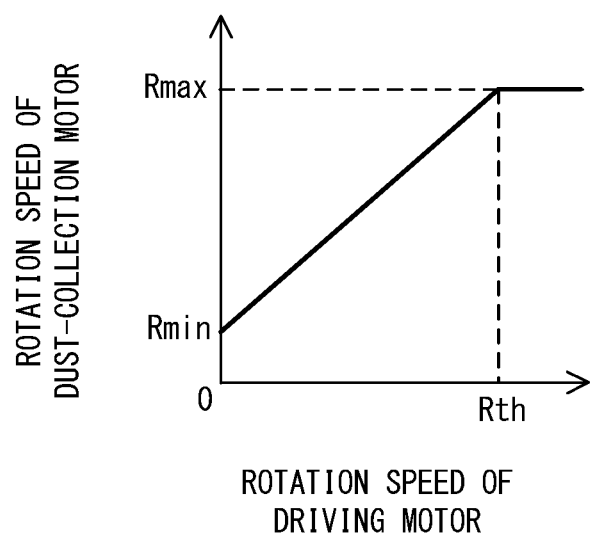
FIG. 4 is a graph schematically showing an example of a correspondence used for drive control of a dust-collection motor.

FIG. 4 schematically shows an example of the correspondence information which can be adopted in the first example. In this example, it is defined that the rotation speed of the dust-collection motor 73 proportionally (linearly) increases from a minimum rotation speed (Rmin) to a maximum rotation speed (Rmax) as the rotation speed of the driving motor 31 increases. Further, it is defined that the rotation speed of the dust-collection motor 73 is kept constant at the maximum rotation speed (Rmax) when the rotation speed of the driving motor 31 exceeds a specified threshold (Rth). The control circuit 80 monitors signals from the wireless adapter 75 and sets the rotation speed of the dust-collection motor 73 according to the rotation speed of the driving motor 31 with reference to the correspondence information, and drives the dust-collection motor 73 at the set rotation speed. When the switch 263 is turned off and the wireless adapter 75 no longer receives a signal from the hammer drill 2, the control circuit 80 stops driving of the dust-collection motor 73.

As described above, in the dust collecting system 11 of the first example, the control circuit 80 of the dust collector 7 can change the rotation speed of the dust-collection motor 73 according to the change in the rotation speed of the driving motor 31, which may cause a change in the generation state of dust, and thereby change the dust collecting power of the dust collector. Particularly, the control circuit 80 increases the rotation speed of the dust-collection motor 73 as the rotation speed of the driving motor 31 increases. Therefore, when the rotation speed of the driving motor 31 is relatively low and the amount of dust generation is expected to be relatively small, power consumption of the dust-collection motor 73 can be suppressed, and when the amount of dust generation is expected to increase as the rotation speed of the driving motor 31 increases, the dust collecting power of the dust collector 7 can be increased. It is noted that the correspondence between the rotation speeds of the driving motor 31 and the dust-collection motor 73 is not limited to the example shown in FIG. 4 and may be appropriately changed.

A second example is now described in which the driving time of the driving motor 31 is adopted as the driving state of the hammer drill 2. In this example, the control circuit 80 (more specifically, CPU) is configured to change the rotation speed of the dust-collection motor 73 according to the driving time of the driving motor 31. The driving time of the driving motor 31 here refers to the duration of driving of the driving motor 31 from start of driving of the driving motor 31.

In this case, the control circuit 50 of the hammer drill 2 causes the control circuit 633 of the wireless adapter 63 to transmit a signal indicating the start of driving of the driving motor 31 when the switch 263 is turned on. Further, the control circuit 50 causes the control circuit 633 to transmit a signal indicating stop of driving of the driving motor 31 when the switch 263 is turned off. The control circuit 753 of the wireless adapter 75 receives the signal, appropriately processes it and outputs the processed signal to the control circuit 80 of the dust collector 7. When the control circuit 80 recognizes the signal indicating the start of driving, the control circuit 80 (CPU) measures the driving time by using a timer. Then, the control circuit 80 sets the rotation speed of the dust-collection motor 73 based on a predetermined correspondence between the driving time and the rotation speed of the dust-collection motor 73. Like in the above-described first example, information defining the correspondence may be stored in advance, for example, in the memory of the control circuit 80.

Figure 5:
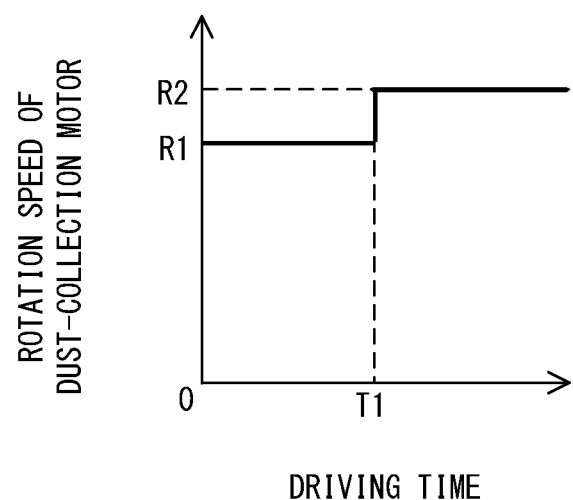
FIG. 5 is a graph schematically showing another example of a correspondence used for drive control of the dust-collection motor.

FIG. 5 schematically shows an example of the correspondence information which can be adopted in the second example. In the example shown in FIG. 5, it is defined that the rotation speed of the dust-collection motor 73 is kept at a rotation speed R1 until the driving time reaches a specified threshold T1. It is further defined that the rotation speed is changed to a rotation speed R2 when the driving time exceeds the threshold T1. The rotation speed R2 is higher than the rotation speed R1. After recognizing the signal indicating start of driving, the control circuit 80 monitors the driving time measured with the timer and sets the rotation speed of the dust-collection motor 73 according to the driving time with reference to the correspondence information, and drives the dust-collection motor 73 at the set rotation speed. The control circuit 80 stops driving of the dust-collection motor 73 when the control circuit 80 recognizes the signal indicating the stop of driving.

As described above, in the second example, the control circuit 80 of the dust collector 7 can change the rotation speed of the dust-collection motor 73 according to the change in the driving time of the driving motor 31, which may cause a change in the generation state of dust and thereby change the dust collecting power of the dust collector. Particularly, the control circuit 80 increases the rotation speed of the dust-collection motor 73 when the driving time exceeds the threshold T1. Therefore, when the driving time of the driving motor 31 is relatively short and the amount of dust generation is expected to be relatively small, power consumption of the dust-collection motor 73 can be suppressed, and when the amount of dust generation is expected to increase as the driving time of the driving motor 31 increases to some extent, the dust collecting power can be increased. It is noted that the correspondence between the driving time and the rotation speed of the dust-collection motor 73 is not limited to the example shown in FIG. 5 and may be appropriately changed.

A third example is now described in which load on the tool accessory 91 is adopted as the driving state of the hammer drill 2. In this example, the control circuit 80 (more specifically, CPU) is configured to change the rotation speed of the dust-collection motor 73 according to the load on the tool accessory 91.

As described above, acceleration detected by the acceleration sensor 611 is an index value which indicates load on the tool accessory 91. Therefore, the control circuit 50 of the hammer drill 2 causes the control circuit 633 of the wireless adapter 63 to transmit a signal indicating the acceleration detected by the acceleration sensor 611 while the switch 263 is in the ON state. The control circuit 753 of the wireless adapter 75 receives the signal, appropriately processes it and outputs the processed signal to the control circuit 80 of the dust collector 7. The control circuit 80 (CPU) sets the rotation speed of the dust-collection motor 73 based on a predetermined correspondence between the acceleration and the rotation speed of the dust-collection motor 73. Like in the above-described examples, information defining the correspondence may be stored in advance, for example, in the memory of the control circuit 80.

Figure 6:
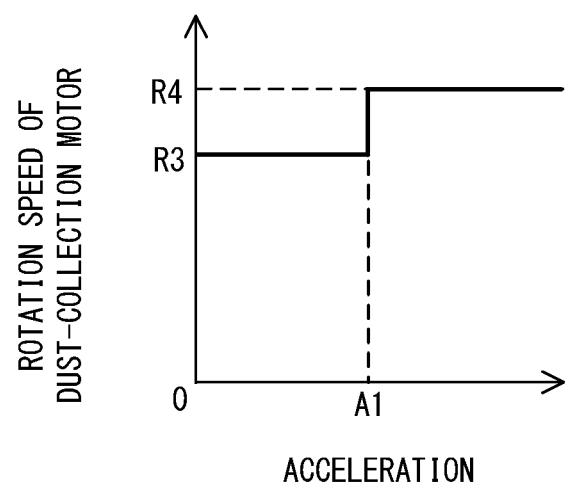
FIG. 6 is a graph schematically showing another example of a correspondence used for drive control of the dust-collection motor.

FIG. 6 schematically shows an example of the correspondence information which can be adopted in the third example. In the example shown in FIG. 6, it is defined that the rotation speed of the dust-collection motor 73 is kept at a rotation speed R3 until the acceleration indicated by the acceleration signal reaches a specified threshold A1. It is further defined that the rotation speed is changed to a rotation speed R4 when the acceleration exceeds the threshold A1. The rotation speed R4 is higher than the rotation speed R3. The control circuit 80 monitors signals from the wireless adapter 75, sets the rotation speed of the dust-collection motor 73 according to the detected acceleration with reference to the correspondence information, and drives the dust-collection motor 73 at the set rotation speed. The control circuit 80 stops driving of the dust-collection motor 73 when the switch 263 is turned off and the wireless adapter 75 no longer receives a signal from the hammer drill 2.

As described above, in the third example, the control circuit 80 of the dust collector 7 can change the rotation speed of the dust-collection motor 73 according to the change in load, which may cause a change in the generation state of dust and thereby change the dust collecting power of the dust collector. Particularly, the control circuit 80 increases the rotation speed of the dust-collection motor 73 as the load increases. Therefore, when the load is relatively small, power consumption of the dust-collection motor 73 can be suppressed, and when the load is relatively large, the dust collecting power of the dust collector 7 can be increased. It is noted that the correspondence between the acceleration and the rotation speed of the dust-collection motor 73 is not limited to the example shown in FIG. 6 and may be appropriately changed.

A fourth example is now described in which the orientation of the hammer drill 2 is adopted as the driving state of the hammer drill 2. In this example, the control circuit 80 (more specifically, CPU) is configured to change the rotation speed of the dust-collection motor 73 according to the orientation of the hammer drill 2.

In this case, the control circuit 50 of the hammer drill 2 causes the control circuit 633 of the wireless adapter 63 to transmit a signal indicating the orientation of the hammer drill 2 while the switch 263 is in the ON state. As described above, the acceleration sensor 611 of the hammer drill 2 is a triaxial acceleration sensor and thus also detects gravity acceleration. Therefore, based on the detected acceleration in three directions, the control circuit 50 is capable of determining, for example, an inclination angle of a detection axis of the acceleration sensor 611 relative to the direction of gravity and thus the inclination angle of the driving axis A1 relative to the direction of gravity (hereinafter referred to as a body angle), as the orientation of the hammer drill 2 relative to the direction of gravity. Thus, the control circuit 50 causes the control circuit 633 to transmit a signal indicating the body angle. The control circuit 753 of the wireless adapter 75 receives the signal, appropriately processes it and outputs the processed signal to the control circuit 80 of the dust collector 7. The control circuit 80 (CPU) sets the rotation speed of the dust-collection motor 73 based on a predetermined correspondence between the body angle and the rotation speed of the dust-collection motor 73. Like in the above-described examples, information defining the correspondence may be stored in advance, for example, in the memory of the control circuit 80.

Figure 7:
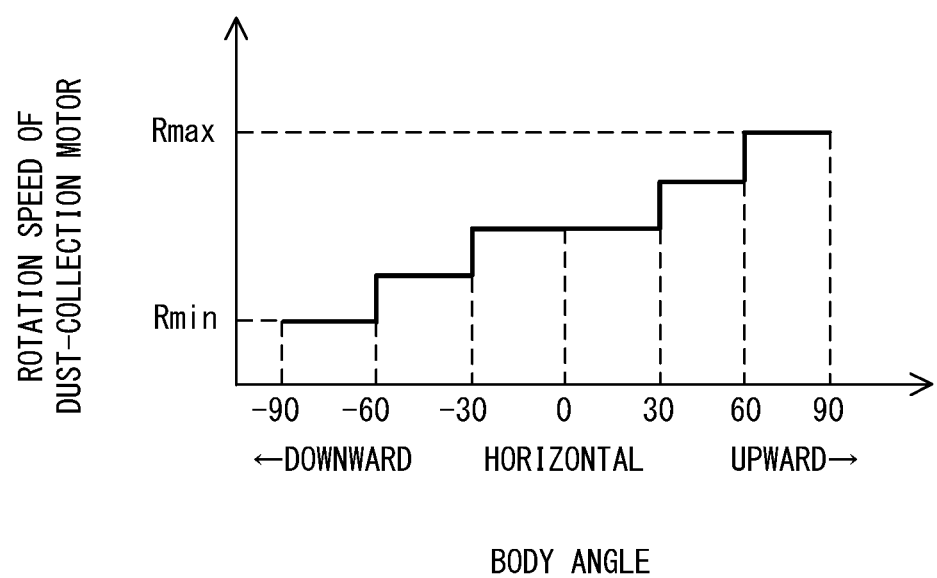
FIG. 7 is a graph schematically showing another example of a correspondence used for drive control of the dust-collection motor.

FIG. 7 schematically shows an example of the correspondence information which can be adopted in the fourth example. In this example, the body angle is defined as zero degree when the driving axis A1 extends in a horizontal direction. Further, the body angle is defined as 590 degrees when the driving axis A1 extends downward in the up-down direction (the direction of gravity), and as 90 degrees when the driving axis A1 extends upward in the up-down direction. It is further defined that the rotation speed of the dust-collection motor 73 decreases stepwise when the body angle is within a range of 530 to 590 degrees, while increasing stepwise when the body angle is within a range of 30 to 90 degrees, as compared with the rotation speed to be set when the body angle is within a range of 530 to 30 degrees. The control circuit 80 monitors signals from the wireless adapter 75, sets the rotation speed of the dust-collection motor 73 according to the body angle with reference to the correspondence information and drives the dust-collection motor 73 at the set rotation speed. The control circuit 80 stops driving of the dust-collection motor 73 when the switch 263 is turned off and the wireless adapter 75 no longer receives a signal from the hammer drill 2.

As described above, in the fourth example, the control circuit 80 of the dust collector 7 can change the rotation speed of the dust-collection motor 73 according to the change in the orientation of the hammer drill 2, which may cause a change in the generation state of dust, and thereby change the dust collecting power of the dust collector. Particularly, in the above-described example, the control circuit 80 increases the rotation speed of the dust-collection motor 73 as the orientation of the hammer drill 2 is changed such that the driving axis A1 extends upward in the up-down direction, while decreasing the rotation speed of the dust-collection motor 73 as the orientation is changed such that the driving axis A1 extends downward in the up-down direction. When processing operation is performed in an upward orientation (i.e. in a state in which the tool accessory is pointed upward), dust may fall toward a user by its own weight, while, when performed in a downward orientation (i.e. in a state in which the tool accessory is pointed downward), dust is likely to fall to the ground. Therefore, by performing such a control, the dust collector 7 can exert appropriate dust collecting power according to the orientation of the hammer drill 2. It is noted that the correspondence between the body angle and the rotation speed of the dust-collection motor 73 is not limited to the example shown in FIG. 7 and may be appropriately changed.

A fifth example is now described in which the operation mode of the hammer drill 2 (that is, the drive mode of the driving mechanism 35) is adopted as the driving state of the hammer drill 2. In this example, the control circuit 80 (more specifically, CPU) is configured to change the rotation speed of the dust-collection motor 73 according to the operation mode of the hammer drill 2.

Figure 8:
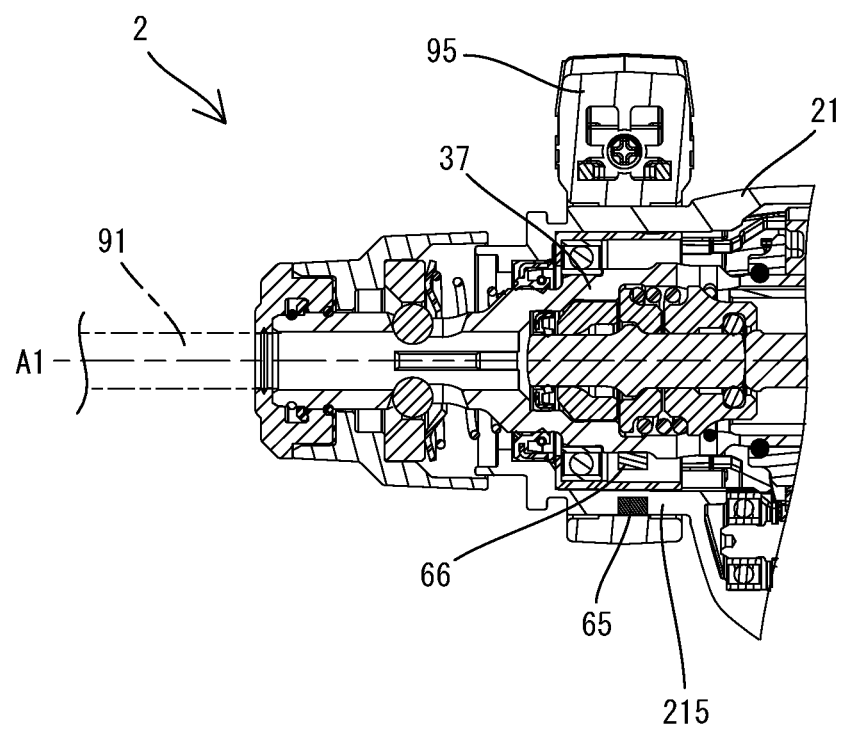
FIG. 8 is an explanatory drawing for showing an example of a structure for determining an operation mode of the hammer drill.

In this case, the hammer drill 2 is provided with a structure for determining the operation mode. For example, as shown in FIG. 8, the hammer drill 2 is provided with a magnet 66 fixed on an outer periphery of the tool holder 37 and a rotation sensor 65 fixed on the barrel part 215. The tool holder 37 is rotationally driven by the rotation-transmitting mechanism 353 of the driving mechanism 35 when an operation mode involving the drilling motion, that is, either one of the hammer drill mode and the drill mode, is selected via the mode-switching dial 36 (see FIG. 1). At this time, the magnet 66 rotates together with the tool holder 37. The rotation sensor 65 is a sensor having a hall element and is configured to detect the magnet 66 when the magnet 66 is located within a specified detection range.

The rotation sensor 65 is disposed in the same position as the magnet 66 in the front-rear direction, and is configured to detect the magnet 66 when the magnet 66 is located right below the driving axis A1. Therefore, when the tool holder 37 is not rotationally driven (that is, when the whole driving mechanism 35 or the rotation-transmitting mechanism 353 is not driven), either a state in which the rotation sensor 65 does not detect the magnet 66 or a state in which the rotation sensor 65 detects the magnet 66 is continued. On the other hand, when the tool holder 37 is rotationally driven (that is, when the rotation-transmitting mechanism 353 is driven), the state in which the rotation sensor 65 does not detect the magnet 66 and the state in which the rotation sensor 65 detects the magnet 66 are alternately repeated. In this manner, the rotation sensor 65 can detect rotation of the tool holder 37. Although not shown, the rotation sensor 65 is electrically connected to the control circuit 80 and configured to output a signal indicating the detection results to the control circuit 80.

The control circuit 50 of the hammer drill 2 determines the operation mode based on the signals from the rotation sensor 65 after starting driving of the driving motor 31, and causes the control circuit 633 of the wireless adapter 63 to transmit a signal indicating the determined operation mode. The control circuit 753 of the wireless adapter 75 receives the signal, appropriately processes it and outputs the processed signal to the control circuit 80 of the dust collector 7. The control circuit 80 (CPU) sets the rotation speed of the dust-collection motor 73 based on a predetermined correspondence between the operation mode of the hammer drill 2 and the rotation speed of the dust-collection motor 73. Like in the above-described examples, information defining the correspondence may be stored in advance, for example, in the memory of the control circuit 80. Although not shown in detail, for example, the rotation speed of the dust-collection motor 73 may be set to the rotation speed RH in a case where the operation mode is the hammer drill mode or the drill mode. Further, the rotation speed may be set to the rotation speed R L which is lower than the rotation speed RH, in a case where the operation mode is the hammer mode.

As described above, in the fifth example, the control circuit 80 of the dust collector 7 can change the rotation speed of the dust-collection motor 73 according to the operation mode of the hammer drill 2. Particularly, in the above-described example, the control circuit 80 sets the rotation speed to be lower in the hammer mode of performing only the hammering motion than in the hammer drill mode or drill mode of performing drilling motion. Finer dust tends to scatter around in the drilling operation in the hammer drill mode and in the drill mode than in the chipping operation in the hammer mode. Therefore, by performing such a control, the dust collector 7 can exert appropriate dust collecting power according to the operation mode of the hammer drill 2. It is noted that the correspondence between the operation mode of the hammer drill 2 and the rotation speed of the dust-collection motor 73 is not limited to the example shown in FIG. 7 and may be appropriately changed.

A sixth example is now described in which the presence or absence of the operation of pressing the tool accessory 91 against a workpiece and the presence or absence of the operation of the trigger 261 are adopted as the driving state of the hammer drill 2. In this example, the control circuit 80 (more specifically, CPU) is configured to change the rotation speed of the dust-collection motor 73 according to the pressing state of the tool accessory 91 and the operation state of the trigger 261.

Figure 9:
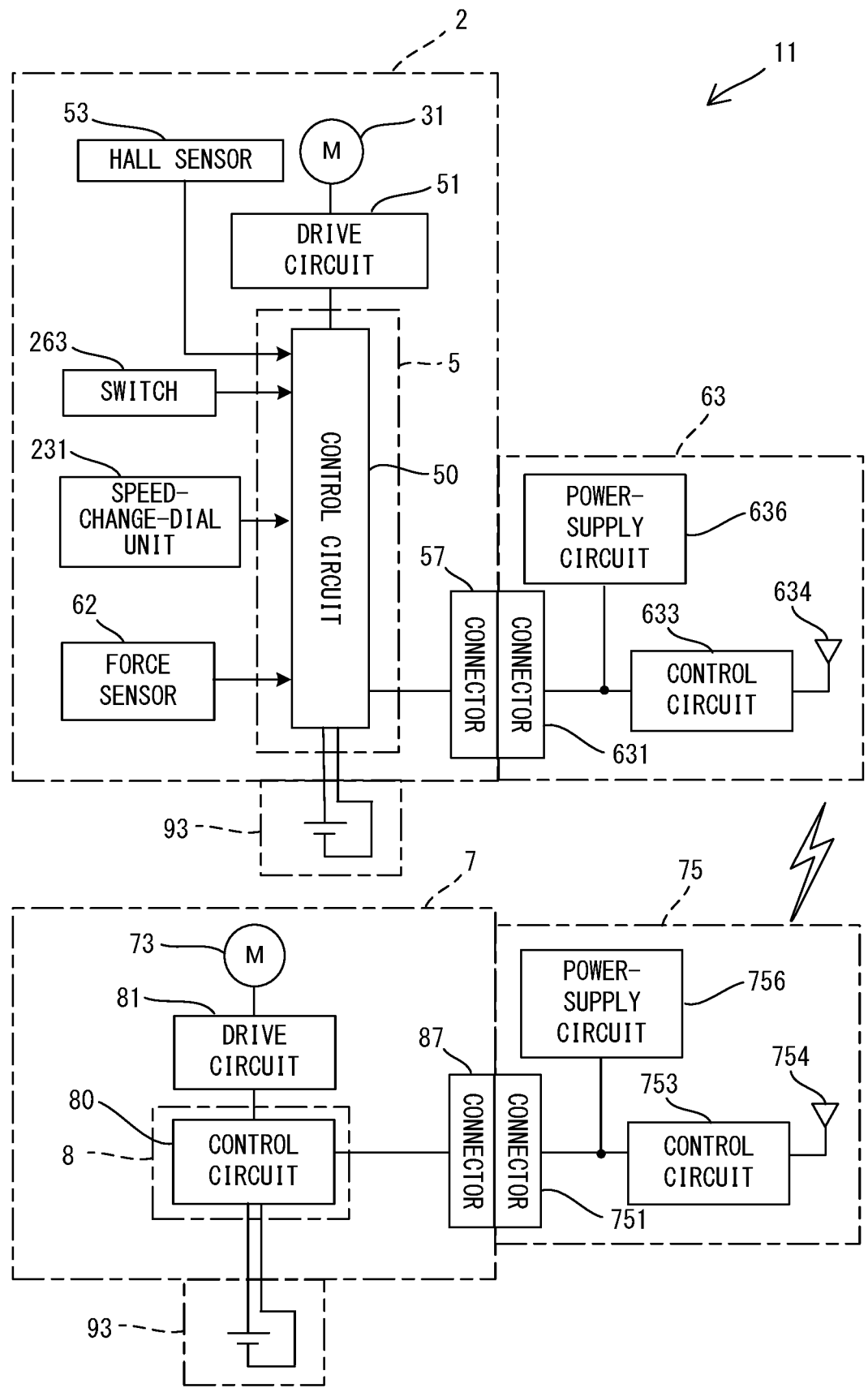
FIG. 9 is a block diagram showing the electrical configuration of a dust collecting system.

In this case, the hammer drill 2 is provided with a structure for detecting pressing of the tool accessory 91 against a workpiece. For example, as shown in FIG. 9, the hammer drill 2 is provided with a force sensor 62 in place of the acceleration sensor 611. Although not shown in detail, the force sensor 62 is provided in the grip part 26 and configured to detect a forward pressing force. When a user holds the grip part 26 and presses the tool accessory 91 forward against a workpiece, the pressing force detected by the force sensor 62 increases.

When determining that a first operation has been performed, based on output signals of the force sensor 62 and the switch 263, the control circuit (CPU) 50 of the hammer drill 2 causes the control circuit 633 of the wireless adapter 63 to transmit a signal indicating this determination. The first operation refers to either one of the operation of pressing the tool accessory 91 against a workpiece and the operation of depressing the trigger 261. The control circuit 50 can determine that the operation of pressing the tool accessory 91 has been performed when the pressing force detected by the force sensor 62 exceeds a specified threshold.

Further, when determining that a second operation has been performed based on output signals of the force sensor 62 and the switch 263, the control circuit 50 causes the control circuit 633 to transmit a signal indicating this determination. The second operation refers to the other one of the operations of pressing the tool accessory 91 against a workpiece and depressing the trigger 261, which is different from the one defined as the first operation. Further, when the first operation and/or the second operation is released, the control circuit 50 causes the control circuit 633 to transmit a signal indicating the release.

The control circuit 753 of the wireless adapter 75 receives the signal, appropriately processes it and outputs the processed signal to the control circuit 80 of the dust collector 7. The control circuit 80 (CPU) starts driving of the dust-collection motor 73 at a preset relatively low rotation speed (initial rotation speed) when the control circuit 80 recognizes a signal indicating that the first operation has been performed. The initial rotation speed of the dust-collection motor 73 may be stored, for example, in the memory of the control circuit 80. Thereafter, the control circuit 80 increases the rotation speed of the dust-collection motor 73 from the initial rotation speed when the control circuit 80 recognizes a signal indicating that the second operation has been performed. In this case, the rotation speed may be preset. Alternatively, it may be set, for example, according to the driving state of the hammer drill 2, like in any of the above-described examples. Thereafter, the control circuit 80 returns the rotation speed of the dust-collection motor 73 to the initial rotation speed when one of the first and second operations is released, and stops driving of the dust-collection motor 73 when both of the first and second operations are released.

As described above, in the sixth example, the control circuit 80 of the dust collector 7 controls the rotation speed of the dust-collection motor 73 based on the detection results of the force sensor 62 and the switch 263. Both of the operation of pressing the tool accessory 91 against a workpiece and the operation of depressing the trigger 261 are operations to be performed for the hammer drill 2 by a user to start the processing operation. Therefore, wasteful power consumption of the dust-collection motor 73 can be reduced by rationally controlling the rotation speed of the dust-collection motor 73 based on the results of detection of these operations.

In the sixth example, the control circuit (CPU) 50 of the hammer drill 2 may be configured to perform a so-called push-drive control, in place of the above-described soft-no-load control. The push-drive control refers to a drive control method of starting driving of the driving motor 31 when both the operation of pressing the tool accessory 91 against a workpiece and the operation of depressing the trigger 261 are performed. In this case, the control circuit 50 starts driving of the driving motor 31 when recognizing that both operations have been performed. In this case, the rotation speed of the driving motor 31 may be preset. Alternatively, it may be set according to the operation amount of the trigger 261 or the driving state of the hammer drill 2. The control circuit 50 may stop driving of the driving motor 31 when both the operation of depressing the trigger 261 and the operation of pressing the tool accessory 91 against a workpiece are released during driving of the driving motor 31.

The controls of the dust-collection motor 73 according to the above-described first to sixth examples may be used separately or in appropriate combination of two or more of them.

Second Embodiment

A dust collecting system 12 according to a second embodiment is now described with reference to FIGS. 10 and 11. The dust collecting system 12 of the present embodiment includes a hammer drill 20 and a dust collector 70. The structures of the hammer drill 20 and the dust collector 70 are substantially the same in part as those of the hammer drill 2 and the dust collector 7 of the first embodiment, and different in part from them. In the following description, structures which are substantially identical to those of the first embodiment are given the same reference signs as in the first embodiment and are not shown and described or briefly shown and described, and different structures are mainly described.

Figure 10:
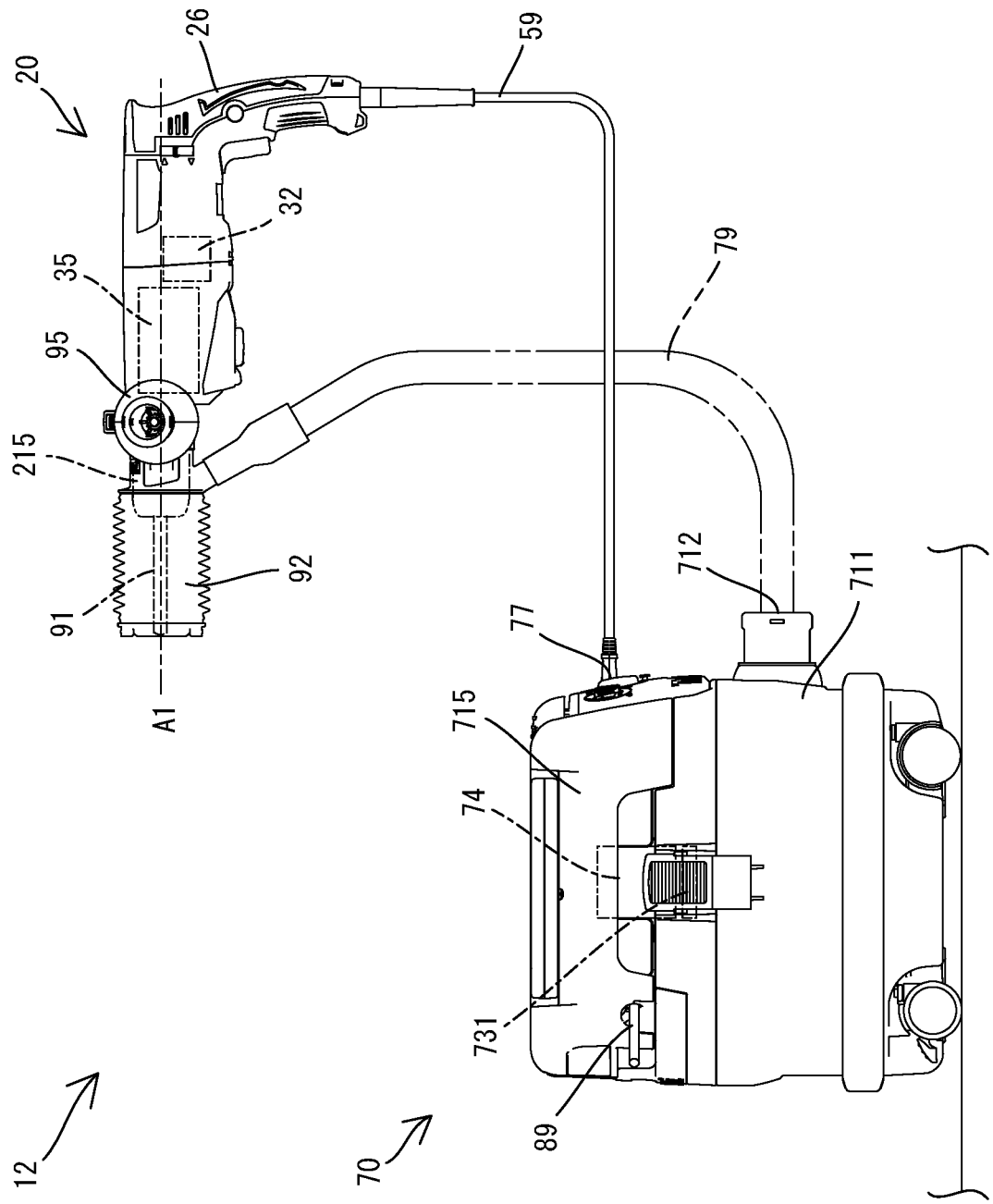
FIG. 10 is an explanatory drawing for showing the overall structure of a dust collecting system.

As shown in FIG. 10, the hammer drill 20 and the dust collector 70 of the present embodiment are both configured to operate with electric power which is supplied from an alternate current (AC) power sources. Therefore, the hammer drill 20 and the dust collector 70 have respective power cables 59 and 89 for connection with A C power sources. Further, the dust collector 70 has an outlet (receptacle) 77 for supplying AC power to an external device. The hammer drill 20 can be connected not only to a commercial power source, but also to the dust collector 70 via the power cable 59 so as to be operated by the AC power supplied from the dust collector 70.

Like the hammer drill 2 of the first embodiment, the hammer drill 20 is a hand-held power tool configured to drive the tool accessory 91 by the driving mechanism 35 which is capable of performing hammering motion and drilling motion by power of a driving motor 32. Further, like the dust collector 7 of the first embodiment, the dust collector 70 is a stationary dust collector which is used in a state in which it is separately placed from the hammer drill 20. The dust collector 70 is configured to suck and collect dust generated by processing operation through the dust-collecting cup 92 and the hose 79, by using air flow generated by the fan 731 which is rotated along with driving of a dust-collection motor 74. Each of the driving motor 32 and the dust-collection motor 74 is an A C motor.

Unlike in the first embodiment, the hammer drill 20 and the dust collector 70 of the present embodiment do not have a function of transmitting and receiving information by wireless communication. As described above, however, when power is supplied to the hammer drill 20 via the outlet 77 of the dust collector 70, in some cases, the driving state of the hammer drill 20 can be detected in the dust collector 70. Therefore, in the present embodiment, the rotation speed of the dust-collection motor 74 is controlled according to the driving state of the hammer drill 20 which is detected by the dust collector 70, which will be described below in detail.

The electrical configuration of the dust collecting system 11 (the hammer drill 20 and the dust collector 70) is now described.

Figure 11:
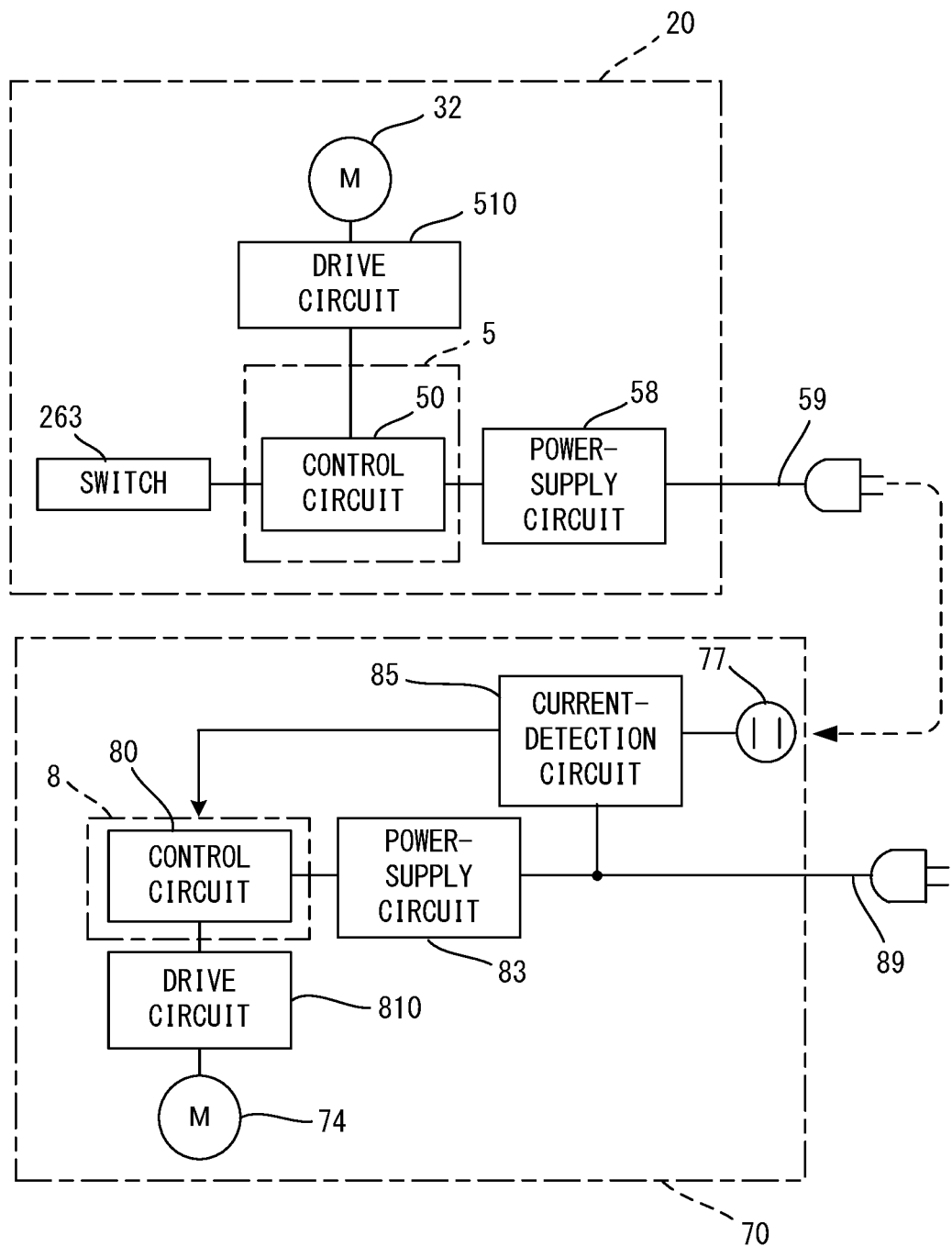
FIG. 11 is a block diagram showing the electrical configuration of the dust collecting system.

As shown in FIG. 11, a drive circuit 510 configured to drive the driving motor 32, the switch 263 which may be turned on and off according to the operation of the trigger 261, and a power-supply circuit 58 are electrically connected to the control circuit 50 of the hammer drill 20. The power-supply circuit 58 is configured to receive AC power supplied via the power cable 59 and to generate power for operating each part of the hammer drill 20 based on this AC power.

A drive circuit 810 configured to drive the dust-collection motor 74, a power-supply circuit 83 and a current-detection circuit 85 are electrically connected to the control circuit 80 of the dust collector 70. The power-supply circuit 83 is configured to receive AC power supplied via the power cable 89 and to generate power for operating each part of the dust collector 70 based on this AC power. The current-detection circuit 85 is provided on a path of electric power supplied from the power cable 89 to the outlet 77. The current-detection circuit 85 is configured to detect current supplied to an external device, such as the hammer drill 20, via the outlet 77. The current-detection circuit 85 outputs a signal indicating the detected current value to the control circuit 80.

Operation control in the dust collecting system 11 is now described.

In the present embodiment, the control circuit (CPU) 50 of the hammer drill 20 sets a rotation speed according to the operation amount of the trigger 261 based on an output signal of the switch 263 and drives the driving motor 32 via the drive circuit 510.

The control circuit (CPU) 80 of the dust collector 70 controls driving of the dust-collection motor 74 via the drive circuit 810 based on output signals of the current-detection circuit 85. More specifically, when driving of the driving motor 32 is started in the hammer drill 20, the current-detection circuit 85 detects current which is supplied to the hammer drill 20, and starts output of signals. When driving of the driving motor 32 is stopped, the current-detection circuit 85 stops output of signals. Therefore, the control circuit 80 recognizes the start or stop of driving of the driving motor 32 and starts or stops driving of the dust-collection motor 74. Further, the control circuit 80 controls the rotation speed of the dust-collection motor 74 based on the output signals of the current-detection circuit 85.

The control circuit 80 may be configured, for example, to increase the rotation speed of the dust-collection motor 74 as the detected current value increases. This is because the current value of the current flowing from the outlet 77 to the hammer drill 2 increases as the rotation speed and/or the load of the driving motor 32 increases. Therefore, in the present embodiment, it can also be said that the control circuit 80 controls the rotation speed of the dust-collection motor 74 according to the rotation speed of the driving motor 32 and the load which are detected as the driving state of the hammer drill 2 by the current-detection circuit 85. Further, like in the first embodiment, the control circuit 80 may set the rotation speed of the dust-collection motor 74 with reference to a predetermined correspondence between the current value and the rotation speed of the dust-collection motor 74.

Alternatively, like in the second example of the first embodiment, the control circuit 80 may change the rotation speed of the dust-collection motor 74 according to the driving time of the driving motor 32. In this case, when recognizing the start of output of signals from the current-detection circuit 85, the control circuit 80 may measure the driving time and set the rotation speed of the dust-collection motor 74 based on a predetermined correspondence between the driving time and the rotation speed of the dust-collection motor 74.

Like in the first embodiment, in the present embodiment, the control circuit 80 also controls the rotation speed of the dust-collection motor 74 according to the driving state of the hammer drill 20, so that the dust collecting power of the dust collector 70 can be changed to appropriately cope with a situation where dust is easily generated and a situation where dust is not easily generated.

Correspondences between the features of the above-described embodiments and the features of the invention are as follows. Each of the dust collecting systems 11 and 12 is an example of the 'dust collecting system'. Each of the hammer drills 2 and 20 is an example of the 'power tool'. The tool accessory 91 is an example of the 'tool accessory'. Each of the dust collectors 7 and 70 is an example of the 'dust collector'. Each of the driving motors 31 and 32 is an example of the 'first motor'. The driving mechanism 35 is an example of the 'driving mechanism'. Each of the dust-collection motors 73 and 74 is an example of the 'second motor'. The fan 731 is an example of the 'fan'. The control circuit 80 is an example of the 'control device'. The control circuit 50 or the hall sensor 53 is an example of the 'first detecting device' according to the present aspect. Each of the acceleration sensor 611 and the current-detection circuit 85 is an example of the 'second detecting device'. The rotation sensor 65 is an example of the 'third detecting device' according to the present aspect. Each of the force sensor 62 and the current-detection circuit 85 is an example of the 'fourth detecting device'. The trigger 261 is an example of the 'operation member'. The switch 263 is an example of the 'fifth detecting device'. The wireless adapters 63 and 75 are examples of the 'first communication device' and the 'second communication device, respectively. The outlet 77 is an example of the 'connecting part'. The power cable 59 is an example of the 'power cable'.

The above-described embodiments are mere examples, and the dust collecting system according to the present invention is not limited to the structures of the dust collecting systems 11 and 12 of the above-described embodiments. For example, the following modifications may be made. Further, one or more of these modifications may be adopted in combination with any of the dust collecting systems 11 and 12 of the above-described embodiment and the claimed invention.

In the above-described embodiments, the hammer drills 2 and 20 are each described as an example of the power tool which is configured to perform processing operation by driving a tool accessory. The power tool which can be adopted is not limited to the hammer drills 2 and 20, but any power tool may be adopted which is used for processing operation (such as drilling, chipping, cutting and grinding) by which dust may be generated. For example, an electric hammer, a circular saw, a grinder or a cutter may be adopted in place of the hammer drill 2 or 20. Further, the dust collector which can be adopted in the present invention is not limited to the dust collectors 7 and 70. The structures of the hammer drills 2 and 20 may be partly replaced with each other. The structures of the dust collectors 7 and 70 may be partly replaced with each other.

The hammer drill 20 and the dust collector 70 which can be connected to an AC power source may also be provided with the wireless adapters 63 and 75 for wireless communication. In this case, when the dust collector 70 is used with a power tool (such as the hammer drill 2 or 20) having the wireless adapter 63, the dust collector 70 can control driving of the dust-collection motor 74 based on information obtained through wireless communication with the power tool, while, when the dust collector 70 is used with a power tool which does not have the wireless adapter 63 but can be connected to the outlet 77 via the power cable 59, the dust collector 70 can control driving of the dust-collection motor 74 based on detection results of the current-detection circuit 85. The wireless adapters 63 and 75 may perform wireless communication in accordance with a predetermined standard and need not necessarily have the same structure. A wireless communication module which is unremovably built in the power tool and the dust collector may be adopted.

In the above-described embodiment, the acceleration sensor 611 and the force sensor 62 are each described as a detecting device for detecting load on the tool accessory 91 (pressing of the tool accessory 91 against a workpiece). However, the detecting device for detecting the load is not limited to these sensors.

For example, in the hammer drill 2, the handle 25 is elastically connected to the body housing 21 so as to be movable relative to the body housing 21. Thus, the handle 25 moves forward relative to the body housing 21 when the tool accessory 91 is pressed against a workpiece. Therefore, the load may be detected by a position sensor which is configured to detect movement of the handle 25 relative to the body housing 21. As such a position sensor, for example, a sensor of a non-contact type (such as a magnetic-field-detection type and an optical type) or a contact type detecting mechanism (such as a mechanical switch) may be adopted. Further, some power tools have a movable unit configured to move rearward together with the tool accessory 91 relative to the body housing 21 in response to pressing of the tool accessory 91 against a workpiece. In this case, the position sensor may also be used. Alternatively or additionally, the load may be detected from the load current of the driving motor 31 or the temperature change of the battery 93.

Plural kinds of information (an index value, a physical quantity) which corresponds to the load on the tool accessory 91 may be detected and used for control of the rotation speed of the dust-collection motor 73. For example, separate detecting devices (such as an acceleration sensor and a position sensor) may be provided to respectively detect vibration and other load so that the rotation speed of the dust-collection motor 73 is controlled based on detection results of the both detecting devices.

In the present embodiment, the rotation sensor 65 of a magnetic-field-detection type is provided to determine the operation mode of the hammer drill 2, but, in place of the rotation sensor 65, for example, an optical sensor may be adopted. Further, a method other than detecting rotation of the tool holder 37 may be adopted to determine the operation mode. For example, a detecting device of a contact type or non-contact type may be adopted which is configured to output different signals according to the switching position (specifically, a position for the selected operation mode) of the mode-switching dial 36 (see FIG. 1).

In the present embodiment, when the switch 263 is turned on, the control circuit 50 and the control circuit 80 respectively start driving of the driving motor 31 (32) and the dust-collection motor 73 (74). Specifically, the control circuits 50 and 80 start driving of the driving motor 31 (32) and the dust-collection motor 73 (74) substantially at the same timing, but may start or stop driving of the driving motor 31 (32) and the dust-collection motor 73 (74) at different timings.

In the above-described embodiments, the control circuit 50 of the hammer drill 2 (20) and the control circuit 80 of the dust collector 7 (70) respectively control driving of the driving motor 31 (32) and driving of the dust-collection motor 73 (74), independently from each other. However, for example, the control circuit 50 may perform both of the above-described drive control processings of the driving motor 31 (32) and the dust-collection motor 73 (74). Alternatively, the above-described drive control processings of the driving motor 31 (32) and the dust-collection motor 73 (74) may be distributed to a plurality of control circuits. In the above-described embodiments, the control circuits 50 and 80 are described which are each formed by a microcomputer including a CPU, but may be formed, for example, by a programmable logic device such as an ASIC (Application Specific Integrated Circuit) and an FPGA (Field Programmable Gate Array).

In view of the nature of the present invention and the above-described embodiments, the following features are provided. The following features can be used in combination with one or more of the above-described embodiments and their modifications and the claimed invention.

(Aspect 1)

The control device is provided in the dust collector.

DESCRIPTION OF THE NUMERALS 11, 12: dust collecting system, 2, 20: hammer drill, 21: body housing, 215: barrel part 22: driving-mechanism-housing part 23: motor-housing part 231: speed-change-dial unit, 24: controller-housing part 245: battery-mounting part, 25: handle, 26: grip part, 261: trigger, 263: switch, 28: upper connection part 281: elastic member, 29: lower connection part 291: support shaft, 31, 32: driving motor, 311: motor shaft, 35: driving mechanism, 351: motion-converting mechanism, 352: striking mechanism, 353: rotation-transmitting mechanism, 36: mode-switching dial, 37: tool holder, 5: controller, 50: control circuit, 51, 510: drive circuit, 53: hall sensor, 57: connector, 58: power-supply circuit, 59: power cable, 61: acceleration sensor unit, 611: acceleration sensor, 62: force sensor, 63: wireless adapter, 631: connector, 633: control circuit, 634: antenna, 636: power-supply circuit, 65: rotation sensor, 66: magnet, 7, 70: dust collector, 711: tank, 712: hose-insertion port 715: cover, 73, 74: dust-collection motor, 731: fan, 75: wireless adapter, 751: connector, 753: control circuit, 754: antenna, 756: power-supply circuit, 77: outlet 79: hose, 8: controller, 80: control circuit, 81, 810: drive circuit, 83: power-supply circuit, 85: current-detection circuit, 87: connector, 89: power cable, 91: tool accessory, 92: dust-collecting cup, 93: battery, 95: auxiliary handle, A1: driving axis

What is claimed is:

1. A dust collecting system including a power tool configured to perform a processing operation on a workpiece by driving a tool accessory, and a stationary dust collector configured to be placed separately from the power tool and to collect dust generated by the processing operation, wherein:

the power tool comprises:
a first motor; and
a driving mechanism configured to translate power of the first motor into the driving of the tool accessory;
the dust collector comprises:
a second motor; and
a fan configured to be rotationally driven by the second motor to generate an air flow for collecting dust,
the dust collecting system comprises a control device configured to control a rotation speed of the second motor according to a driving state of the power tool; and
the control device is configured to change the rotation speed of the second motor from a first rotation speed R1 to a second rotation speed R2 according to a driving time of the first motor from a start of driving of the first motor, wherein R1 is greater than zero.

2. The dust collecting system as defined in claim 1, wherein the control device is configured to change the rotation speed of the second motor according to a rotation speed of the first motor.

3. The dust collecting system as defined in claim 2, wherein the control device is configured to increase the rotation speed of the second motor as the rotation speed of the first motor increases.

4. The dust collecting system as defined in claim 2, wherein the power tool further includes a first detecting device configured to detect the rotation speed of the first motor.

5. The dust collecting system as defined in claim 1, wherein the control device is configured to increase the rotation speed of the second motor as the driving time increases.

6. The dust collecting system as defined in claim 1, wherein:
the power tool further includes a second detecting device configured to detect a load on the tool accessory, and
the control device is configured to change the rotation speed of the second motor according to the load.

7. The dust collecting system as defined in claim 6, wherein the control device is configured to increase the rotation speed of the second motor as the load increases.

8. The dust collecting system as defined in claim 1, wherein:
the power tool includes a first communication device,
the dust collector includes a second communication device, and
the first communication device and the second communication device are capable of wireless communication with each other.

9. The dust collecting system as defined in claim 1, wherein:
the dust collector further includes a connecting part to which a power cable of an external device is connectable, and
the power tool further includes a power cable, and is configured to operate with electric power supplied from the dust collector via the power cable connected to the connecting part.

10. The dust collecting system as defined in claim 2, wherein:
the power tool further includes a detecting device configured to detect a load on the tool accessory, and
the control device is configured to change the rotation speed of the second motor according to the load.

11. The dust collecting system as defined in claim 10, wherein the control device is configured to set the rotation speed of the second motor according to an orientation of the power tool.

12. The dust collecting system as defined in claim 11, wherein:
the driving mechanism has a plurality of operation modes, the plurality of operation modes including a first operation mode for performing at least a drilling motion of rotationally driving the tool accessory around a driving axis, and a second operation mode for performing only a hammering motion of linearly driving the tool accessory along the driving axis, and
the control device is configured to drive the second motor at rotation speeds that differ between the first operation mode and the second operation mode.

13. A dust collecting system including a power tool configured to perform a processing operation on a workpiece by driving a tool accessory, and a stationary dust collector configured to be placed separately from the power tool and to collect dust generated by the processing operation, wherein:
the power tool comprises:
a first motor; and
a driving mechanism configured to translate power of the first motor into the driving of the tool accessory;
the dust collector comprises:
a second motor; and
a fan configured to be rotationally driven by the second motor to generate an air flow for collecting dust,
the dust collecting system comprises a control device configured to control a rotation speed of the second motor according to a driving state of the power tool; and
the control device is configured to set the rotation speed of the second motor according to an orientation of the power tool.

14. A dust collecting system including a power tool configured to perform a processing operation on a workpiece by driving a tool accessory, and a stationary dust collector configured to be placed separately from the power tool and to collect dust generated by the processing operation, wherein:
the power tool comprises:
a first motor; and
a driving mechanism configured to translate power of the first motor into the driving of the tool accessory;
the dust collector comprises:
a second motor; and
a fan configured to be rotationally driven by the second motor to generate an air flow for collecting dust,
the dust collecting system comprises a control device configured to control a rotation speed of the second motor according to a driving state of the power tool;
the driving mechanism has a plurality of operation modes, the plurality of operation modes including a first operation mode for performing at least a drilling motion of rotationally driving the tool accessory around a driving axis, and a second operation mode for performing only a hammering motion of linearly driving the tool accessory along the driving axis, and
the control device is configured to drive the second motor at rotation speeds that differ between the first operation mode and the second operation mode.

15. The dust collecting system as defined in claim 14, wherein the power tool further includes a third detecting device configured to detect the operation mode of the driving mechanism.

16. A dust collecting system including a power tool configured to perform a processing operation on a workpiece by driving a tool accessory, and a stationary dust collector configured to be placed separately from the power tool and to collect dust generated by the processing operation, wherein:

the power tool comprises:
  a first motor;
  a driving mechanism configured to translate power of the first motor into the driving of the tool accessory;
  a first detecting device configured to detect a pressing of the tool accessory against the workpiece;
  an operation member configured to be externally operated by a user; and
  a second detecting device configured to detect an operation of the operation member,
the dust collector comprises:
  a second motor; and
  a fan configured to be rotationally driven by the second motor to generate an air flow for collecting dust,
the dust collecting system comprises a control device configured to control a rotation speed of the second motor according to a driving state of the power tool; and
the control device is configured to control a driving of the second motor based on detection results of the first detecting device and the second detecting device.

* * * * *